Oct. 13, 1964  H. C. STOUT  3,153,184
MULTI-SPEED INDUCTION TYPE MOTOR
Filed Sept. 28, 1962  2 Sheets-Sheet 1
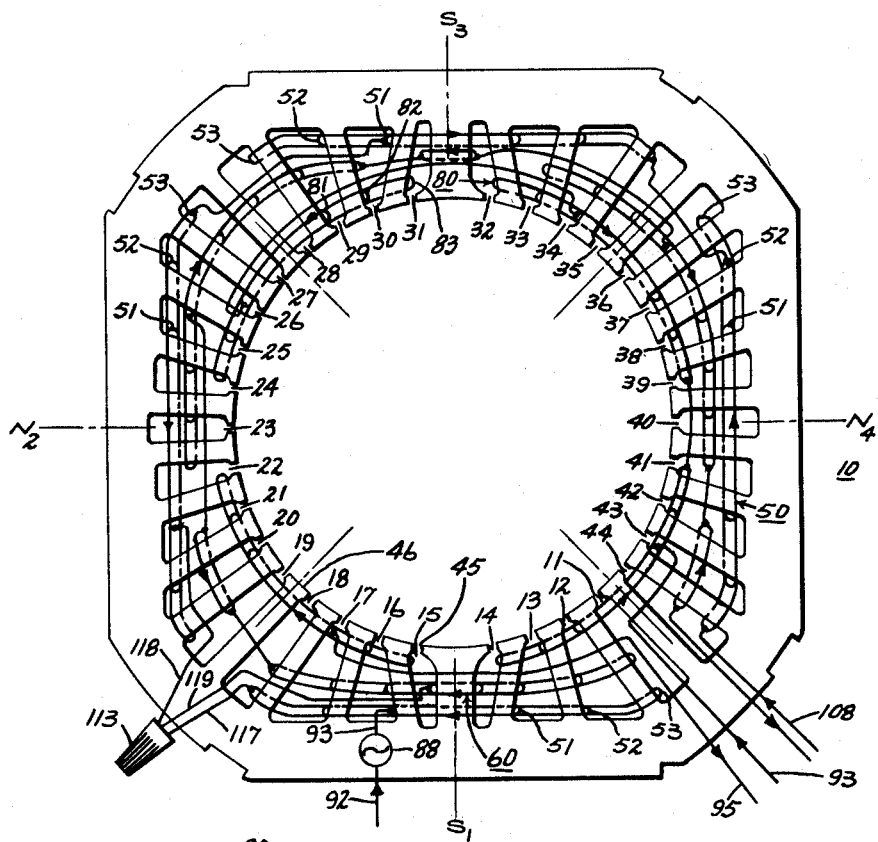
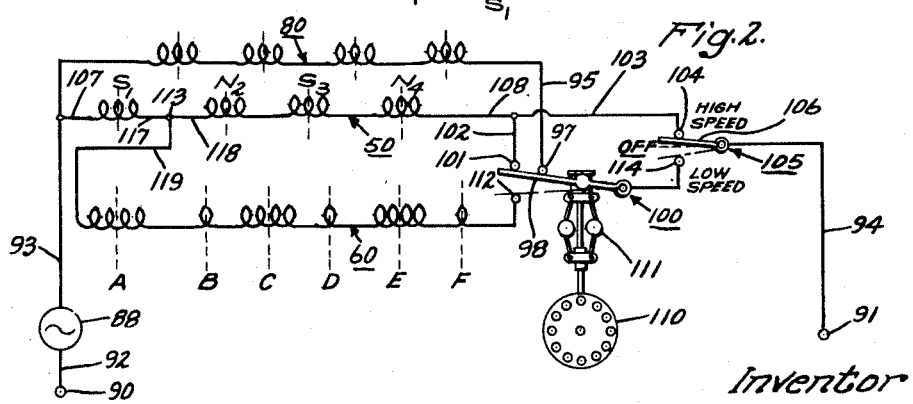
Inventor:
Harold C. Stout,
by John Dr. Stoudt
Attorney.

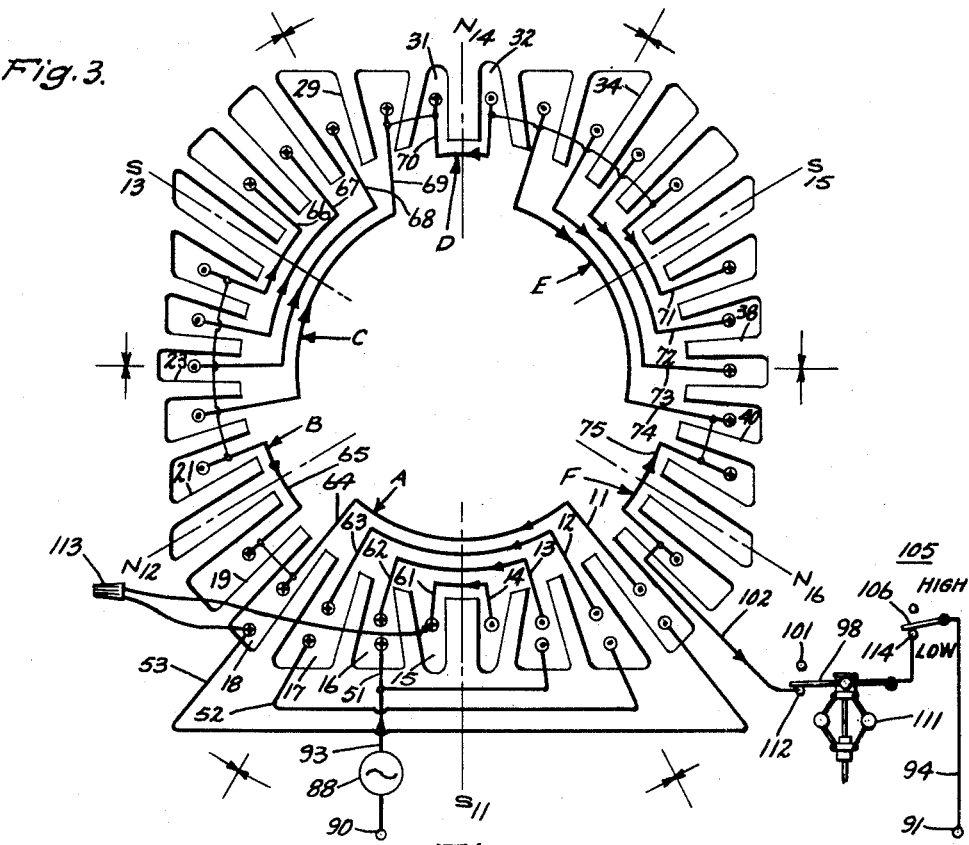

United States Patent Office 3,153,184
Patented Oct. 13, 1964

3,153,184
MULTI-SPEED INDUCTION TYPE MOTOR
Harold C. Stout, De Kalb, Ill., assignor to General
Electric Company, a corporation of New York
Filed Sept. 28, 1962, Ser. No. 227,030
6 Claims. (Cl. 318—224)

My invention relates to alternating current multi-speed induction motors and more particularly to single phase motors of that type adapted to operate selectively at two different speeds.

Two speed, single phase induction motors are customarily provided with two entirely separate stator main winding arrangements, one for the high speed operation of the motor and the other for the low speed running condition. The one main winding arrangement, when energized, produces the desired number of magnetic poles for the high speed operation, whereas the other winding, when excited, produces a different, higher number of poles for the low speed operation. Each magnetic pole for the respective windings is normally formed by a separate, concentrically wound coil group with the groups for a given winding being identical in construction and symmetrically disposed around the stator. Unfortunately, this type of motor is expensive to produce, due at least in part to the amount of materials required in its construction and the kind of manufacturing procedures and winding connections needed for its fabrication.

It is well known that a less expensive two speed motor structure is one which operates on a consequent pole theory. For example, one suggested approach includes a single winding arrangement to produce two different motor speeds, with reversing connections provided for every other pole. When the poles are connected so that every other one is of opposite polarity, the motor will run at one speed, and when the poles are connected with like polarity, the motor will run at a lower speed, approximately half the first speed. Specifically, if all the poles of the winding are of the same polarity, an equal number of consequent poles are formed between them so that the motor operates as if it had twice as many poles as in the first connection. Generally speaking, it is inherent in consequent pole operation that high leakage reactance and harmonic fluxes are developed, which adversely affect the torque and performance characteristics of the motor. Consequently, winding arrangements of this nature have not enjoyed wide commercial acceptance in spite of certain manufacturing economies attributable to the single main winding employed in the motor.

Accordingly, it is a general object of the invention to provide a new and improved winding arrangement and circuitry for a multi-speed electric motor; and it is a more specific object to provide an improved winding arrangement which is economical to wind and to install, and provides satisfactory motor operation in at least two speeds.

It is a further object of the invention to provide a new and improved winding arrangement for a two speed motor which will be devoid of the undesirable and detrimental characteristics previously outlined with respect to consequent pole operation, yet will still be economical to produce.

It is still another object of the present invention to provide a new and improved winding arrangement for two speed induction motors wherein a portion of the winding which defines the main running poles of the higher speed operation complements and is a related part of the winding employed for the lower operating speed such that at either speed there is generally electromagnetic symmetry of the poles and satisfactory overall operation.

In carrying out the objects of my invention in one form, I provide a single phase induction motor, having a magnetic stator core, with a new and improved winding arrangement for selectively operating the motor at two speeds. In the preferred embodiment, the winding arrangement includes a first main winding, formed of a plurality of concentric coils and disposed in the winding receiving slots of the core to provide at least two primary magetic running poles for operating the motor at one speed. A second main winding having a number of coils is also carried by the core. Switching means is employed to connect at least a part of the coils of one of the primary poles of the first winding in series relation with the second winding so that there is concurrent energization of those coils with the second winding. In addition, I locate the last-mentioned coils of the primary first winding pole in the same slots as certain coils of the second winding such that there is additive magnetic relation between them to produce augmenting M.M.F.'s (magnetomotive force) when the second winding is energized.

With this arrangement the common slot additive serially connected coils of both windings, together with the remaining coils of the second winding when selectively energized, define an even number of primary running poles in excess of the number of the first winding poles for operating the motor at a second speed. This relationship of windings permits simplification in the installation of the coils, if pre-formed, onto the core and ease of connection while achieving a savings in coil material. Moreover, in spite of the economies involved, I am able to provide a general electromagnetic symmetry and balanced M.M.F. pattern for the running pole of each speed of operation with the motor having very satisfactory low level noise and good performance characteristics.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawings.

In the drawings:

FIG. 1 is a schematic end view of a stator core member of a single phase split phase motor including the preferred embodiment of the improved winding arrangement and circuitry of this invention, and adapted to operate selectively as either a four pole or a six pole machine;

FIG. 2 is a schematic circuit diagram for the stator of FIG. 1 showing the connection of the individual coils for either four or six pole operation;

FIG. 3 is a schematic diagram of the stator member of FIG. 1, with only the coils forming the six poles being included in order to show more clearly the direction of current flow in the coils and the manner in which the coils cooperate to define six poles of alternating polarity when the coils are connected for six pole operation; and FIG. 4 is a developed winding diagram corresponding to FIG. 3.

Turning now to the drawings in more detail, for purposes of explanation and disclosure the preferred form of the invention has been illustrated in connection with an alternating current single phase two speed induction motor of the resistance split phase type. More specifically, by way of example, the motor includes a stator member, identified generally by reference 10 in FIG. 1, having a laminated magnetic core formed with thirty-four winding coil accommodating slots numbered from 11 through 44 inclusive in the drawings. The slots, which define a corresponding number of teeth therebetween, each have an entrance 45 in communication with a rotor receiving bore 46 formed by the teeth centrally of the core. The slot entrances are angularly spaced ten degrees apart, with the exception of the angular distance between slots 14, 15 and between slots 31, 32 which is twenty degrees. Thus, in effect, the illustrated stator core is a modified thirty-six slotted type. Disposed in these slots is a winding arrangement which embodies one form of my invention as applied to four and six pole motor operation.

This arrangement as shown most clearly in FIG. 1 includes a main winding 50, arranged in the slots to provide four circumferentially spaced primary poles, with each pole being formed by a group of three concentric coils 51, 52, and 53 wound to span in effect, four, six, and eight teeth about radial pole centers respectively designated at $S_1$, $N_2$, $S_3$, $N_4$ in FIGS. 1 and 2 for the four poles. Thus, for instance, with reference to the pole having a center at $S_1$, the sides of innermost coil 51 are received in slots 13, 16, the sides of intermediate coil 52 are carried by slots 12, 17 and the outermost coil sides reside in slots 11, 18. For simplicity in representation and discussion, when reference is hereinafter made to these four primary poles of winding 50, the radial center designations will be employed. As suggested by the designations and illustrated in FIG. 1, the poles are serially connected and arranged on the core such that opposite instantaneous polarity is provided for adjacent poles. In addition, I prefer to wind each pole similarly with a preselected number of wire turns, thereby obtaining a correspondence between the individual poles, both as to turns relation and to coil deployment on the core. As a result of this coil formation, a satisfactory effective turns relationship or generally balanced M.M.F. pattern is produced at each pole for the four pole operation of the motor.

A second main winding, generally indicated by numeral 60 in the drawings, is also accommodated by the core slots, and in accordance with an important aspect of my invention, is so related to a part of the first main winding 50 that the relationship not only permits an economy in the fabrication of the motor, but does so while providing a highly satisfactory and balanced motor performance at either speed of operation.

More specifically, the embodiment shown in the drawings derives the optimum benefit of my invention, both from the standpoint of economy and performance. As shown, winding 60 comprises a number of groups of wire turns in the form of fifteen coils 61–75 inclusive provided in six coil groups, denoted in FIGS. 2, 3 and 4 by letters A, B, C, D, E, and F. In the illustrated form coil groups A, C, and E each include four concentric coils while the other three groups B, D, and F each comprise one coil. As seen in FIGS. 3 and 4, coil group A is defined by coils 61, 62, 63 and 64, from the innermost coil to the outermost coil in the group. This group, which will be described in more detail hereinafter, is located on the stator core such that its radial center is approximately coincident with the radial center for pole $S_1$ of main winding 50. Further, the sides of coils 62, 63, and 64 in coil group A are respectively accommodated in the same slots as the sides of coils 51, 52, and 53 in pole $S_1$ of winding 50.

With respect to the other coil groups of winding 60 and the manner in which they are deployed in the core slots (see FIGS. 1, 3, and 4) group B has its single coil 65 in slots 19, 21, coils 66, 67, 68, 69 of group C are disposed in slots 25 and 27, 24 and 28, 23 and 29, and 22, 30. The coils 70 and 75 in each of groups D and F are carried respectively by slots 31, 32 and 42, 44, with the four concentric coils 71–75 of group E being distributed in slots 36, 38; 35, 39; 34, 40; and 33, 41.

For starting purposes, the motor of the exemplification incorporates a start winding 80 having four groups of three concentric coils 81, 82, 83 each to provide four primary start winding poles having centers shifted about ninety electrical degrees from adjacent pole centers of main winding 50.

The preferred manner in which the three windings 50, 60, and 80 are connected in circuit relation for two speed selective operation is displayed by the schematic presentation in FIG. 2. The starting condition for the higher speed of operation, is shown by the solid lines. As will be evident from FIG. 2, during this condition, main winding 50 and starting winding 80 are energized in parallel from A.-C. power source 90, 91 through line 92, having a conventional motor protector 88 therein, and line 94. In particular, start winding 80 is connected between the lines, through conductor 95, contact side 97 and movable contact arm 98 of a centrifugally operated switch 100, through stationary contact side 101, conductors 102, 103 to contact side 104 (high speed side) of a single pole-double throw speed selector switch 105 having its movable contact 106 in series with line 94. Main winding 50 is excited from line 92 through conductor 103, switch 105 to line 94.

After the motor has attained a predetermined speed, the rotor 110, shown as a conventional induction squirrel-cage type, and a standard centrifugal mechanism 111 actuate contact arm 98 of centrifugal switch to the position shown by the broken lines, that is, with arm 98 making engagement with contact side 112. This operation opens contact sides 97 and 101 of switch 98 and removes the start winding from the circuit. The four primary poles of main winding 50 are still serially energized between lines 92, 94 through coil taps 107, 108, conductor 103 and switch 105. It should be noted at this time that the coils of main winding 60 are serially connected to contact side 112 of centrifugal switch 100 and to the coils of primary pole $S_1$ of main winding 50 at coil tap junction 113 located between poles $S_1$ and $N_2$ of winding 50. However, since movable arm 98 is in open circuit with contact side 114 (the low speed side) of the double pole switch 105, winding 60 will not be excited, and the motor operates at running speed on the four poles defined by main winding 50. To discontinue operation of the motor, it is merely necessary to move arm 106 of switch 105 to the "off" position, between contact sides 104 and 114.

Turning now to the low speed operation of the motor, it will be appreciated from FIG. 2 that under starting conditions, with movable arm 106 of switch 105 in the lower or slow speed position and arm 98 in the position shown by the solid lines, both the four pole main winding 50 and start winding 80 will be energized in parallel and main winding 60 will again be in open circuit due to open contact side 112 of the centrifugal switch 98. Under these starting conditions, the start winding is excited from line 92, through side 97 of switch 100 and contact side 114 of switch 105 to line 94. Winding 50 is likewise connected through the two switches to lines 92, 94 but through conductor 103.

When the motor speed reaches the speed at which the centrifugal mechanism is actuated to operate switch 100, switch arm 98 will be moved to make contact with contact side 112, establishing a closed series circuit through all the coil groups of winding 60, and the coils 51, 52, and 53 of pole $S_1$ of main winding 50. The other three primary poles $N_2$, $S_3$, and $N_4$ of winding 50 will be in open circuit in view of open contact sides 101 and 104 of the two switches 100 and 105.

This latter low speed operating condition is better revealed in FIGS. 3 and 4 which will be referred to in describing the preferred way in which the coils of primary pole $S_1$ for main winding 50 cooperate with the coils of main winding 60 to provide six poles for the low speed six pole operation. In FIG. 3, the lines connecting the coil sides, represented by the small circles, indicate the coil end turns.

Assuming that the direction of current flowing through the various excited coils of pole $S_1$ of winding 50 and all the coils of winding 60, is that indicated schematically by the arrows shown in FIGS. 3 and 4, then the coils will together generate six poles of instantaneous alternating polarity, $S_{11}$, $N_{12}$, $S_{13}$, $N_{14}$, $S_{15}$, and $N_{16}$ circumferentially around the core. Furthermore, the pole centers for these poles will be located at the radial center of the six pole groups or winding 60, with the pole extremities terminating in the center of slots 12, 17, 23, 29, 34, and 40. In theory, one half of the total number of wire turns of the energized coils disposed in these slots would form the outermost parts of each of the adjacent poles.

It will be recalled from the above description that in the illustrated embodiment, certain coils of coil group A of winding 60; e.g., coils 62, 63, and 64, are disposed in the same slots as certain coils of primary pole $S_1$; e.g. coils 51, 52, 53. That is to say, the outermost coil sides in each set of coils lie in the same slots (a coil side of coils 64 and 53 being common in slots 11 and 18) and the radial centers of the two concentric coil sets are approximately coincident. Thus, with the current flow in these "common slotted" coils under consideration being in the same relative direction, the energized coil sides in slots 11, 12, 13, 16, 17, and 18 will be in additive magnetic relation. Consequently by the proper selection of the number of wire turns in each of these "common" coils, as well as the remaining coils in winding 60, it is readily possible to provide general electromagnetic symmetry for the six poles in the low speed operation. This will become more apparent from the example subsequently set out.

With the foregoing arrangement, the coils of coil group A, which are in slots common with the coils of pole $S_1$, require fewer wire turns than corresponding coils 67, 68, 69, 72, 73, 74 in coil groups C and E, and a generally uniform M.M.F. pattern for the six running poles $S_{11}$, $N_{12}$, $S_{13}$, $N_{14}$, $S_{15}$ and $N_{16}$ is attained without adversely affecting the electromagnetic balance of the four primary poles in main winding 50. Further, the coils of group A, as well as the other coils in winding 60, can be readily inserted and installed into the slots of the core, and the expense of making the connections of the individual coils minimized. Note, for instance, in FIGS. 1 and 2 the desirable proximity of junction 113 to the two coil taps 117 and 118 of coils 51 in poles $S_1$, $N_2$ of winding 50 and to the tap 119 for coil 61 of group A in the other main winding.

The following example is given in order to illustrate more clearly how the invention, as described above, has been satisfactorily carried out and successfully reduced to practice in actual practice. The motor was a single phase resistance split phase induction type rated at 1/3 horsepower, 60 cycle, 115 volts and employed a stator core and winding arrangement substantially identical to that illustrated in the drawings. The motor was capable of selective operation at either 1725 or 1140 r.p.m. at full load with the centrifugal mechanism actuating in the range of 1040 to about 1100 r.p.m. The start winding included enameled copper wire 0.0213 inch in diameter with a coil distribution as follows: coil 81, 13 turns; coil 82, 20 turns; and coil 83, 21 turns.

Main winding 50 was wound with aluminum wire having a diameter of 0.0508 inch and included a turn distribution in which coils 51, 52, and 53 for each of the four poles included 17, 27, and 30 turns respectively.

With reference to main winding 60, it consisted of 0.038 inch copper wire. The coils in group A, innermost to outermost, had 19, 17, 14, and 4 turns respectively. Coils 65, 70, and 75 each had 19 turns and the coils in large number coil groups C and E had 19, 34, 41, and 34 turns, considering the coils as they individually progressed from the center toward the outside of the concentric groups.

In the example just given, it will be seen that the four poles of the main winding 50 all included symmetry in both wire turns and coil deployment. When the winding was energized for four pole running conditions, the coils produced a satisfactory M.M.F. pattern for each pole and the motor exhibited good over-all performance; e.g., full load watts output over 249, and breakdown torque in excess of 40 oz. feet.

For the six pole operation, with coils 51, 52 and 53 serially energized with the coils of winding 60, each of the six running poles had a balance in turns deployment and in M.M.F. pattern. The coil sides of coils 51, 52 and 53 and of coils 62, 63, and 64 in the common slots are in additive complementing magnetic relation to produce augmenting M.M.F.'s. Since in theory, at least, the total number of turns disposed in slots 12, 17, 23, 29, 34, and 40 must be evenly divided between adjacent poles, the wire turns deployment for each of the six poles in the six pole operation would be 19, 34, and 20.5 (inside to outside of each pole) to provide the balanced M.M.F. pattern. Like the four pole operation, the motor performed well and rather quietly under the low speed six pole conditions just described. Even though different type and size wire was employed for windings 50 and 60, in actual tests no dissymmetry between poles for the six pole operation was discernable, although there may have been a slight noncritical difference in the value of the resistance. However, this difference did not appear to be detrimental to the performance of the motor.

It should be apparent that while I have described the preferred embodiment, as applied to four and six pole motor operation, and a particular turn and coil deployment which derive the best advantages from my invention, the principles enunciated above regarding the present invention are equally applicable to other two or more speed multi-pole arrangements having a minimum of two poles for the high speed operation. Thus, while I have shown and described what at present is considered to be the preferred embodiment of my invention in accordance with the patent statutes, it will be obvious to those skilled in the art that changes and modifications may be made in the disclosed structure without departing from my invention, and it is, therefore, aimed in the appended claims to cover all such changes and modifications as fall within the true spirit and scope of my invention.

What I claim as new and desire to secure by Letters Patent of the United States is:

1. In a single phase induction type motor for operation selectively at multi-speed, a magnetic core having a plurality of slots carrying at least two main windings; a first main winding positioned in said slots to form at least two primary magnetic running poles for operating the motor at one speed; each of said poles comprising a plurality of coils; a second main winding having a plurality of coils positioned in said slots; means connecting at least a part of the coils of one primary pole of said first winding in series relation with said second winding for energization therewith; said last-mentioned coils of said one pole being located in the same slots of the core as coils of said second main winding and being arranged in additive magnetic relation therewith to produce augmenting M.M.F.'s when said second winding is energized; said additive serially connected coils of both windings, together with the remaining coils of said second winding, defining an even number of primary running poles in excess of the number of the first winding poles for operating the motor at a second speed, with the running poles for each speed of operation being generally symmetrical electromagnetically.

2. In a single phase induction type motor for operation selectively at more than one speed, a magnetic core having a plurality of slots carrying at least two main windings; a first main winding disposed in said slots to form at least two primary magnetic running poles of alternating polarity for operating said motor at one speed, each of said poles comprising a number of concentrically distributed coils; a second main winding positioned in said slots to form a plurality of coil groups; switching means connecting at least a part of the coils of one pole of said first winding in series relation with said second winding for energization therewith; said last-mentioned coils of said first winding being located in the same slots as part of the coils of one of said groups and being in additive magnetic relation therewith such that the currents in the coils for both windings located in the same slots will flow therethrough in the same direction for any given common slot when said second winding is energized to produce augmenting M.M.F.'s; said additive serially connected coils of both windings, together with the remaining coil groups of said second winding, defining an even number of primary running poles in excess of the number of said first winding poles for operating said motor at a second speed, with the running poles for each speed of operation providing a generally symmetrical M.M.F. pattern.

3. In a single phase induction type motor for operation selectively at a number of speeds, a magnetic core having a plurality of slots carrying at least two main windings; a first main winding positioned in said slots to form at least two primary magnetic running poles of alternating polarity for operating the motor at one speed; each of said poles comprising a plurality of concentrically distributed coils; a second main winding having a number of coils positioned in said slots to form a plurality of coil groups with more than one group having concentrically arranged coils; means connecting the concentric coils of one pole of said first winding in series relation with said second winding for energization therewith; said concentric coils of said one pole of the first winding being carried in the same slots as the concentric coils of one of said coil groups of said second winding, with the radial centers for the respective concentric coils being approximately common; said last-mentioned concentric coils for both windings having the approximate common radial centers arranged in additive magnetic relation to provide a running pole of the same polarity adjacent said radial centers and to produce augmenting M.M.F. patterns when said second winding is energized; said additive serially connected concentric coils, together with the other coils of said second winding, defining at least four primary running poles but of different number than those of said first winding for operating the motor at a second speed, with the running poles for each speed of operation being generally symmetric in electromagnetic characteristics.

4. In a single phase multi-spaced induction type motor for operation selectively at two speeds, a magnetic core having a plurality of slots; a first main winding disposed in said slots to form four primary running poles for operating the motor at one speed; each of said poles comprising a number of concentrically wound coils formed of a predetermined number of wire turns, with adjacent poles having opposite polarity; a second main winding positioned in said slots and formed by six groups of coils, with three coil groups having more coils than the other three coil groups of said second winding and being alternately positioned therewith on said core; the three higher numbered coil groups each being concentrically wound; one of said last-mentioned coil groups having a radial center in common with the radial center of one of said four primary running poles of said first winding and having coils located in the same slots as coils of said one pole; means connecting the coils of said one pole of said first winding in series relation with the coil groups of said second winding for energization therewith; the coils of said one coil group having less turns than the corresponding coils in the other two higher numbered coil groups and being in additive magnetic relation with coils of said one pole of said first winding to produce augmenting M.M.F.'s when said second winding is energized; said one pole of said first winding and additive serially connected coil group of said second winding which have the common radial centers, together with the other five coil groups of said second winding, defining six primary running poles for operating the motor at a second speed with the running poles for each speed having general M.M.F. symmetry at the selective speed of operation.

5. In a single phase induction type motor for operation selectively at two speeds, a magnetic core having a plurality of slots; a first main winding disposed in said slots to form four primary running poles for operating the motor at high speed; each of said poles similarly comprising at least three concentric coils formed of a predetermined number of wire turns, with adjacent poles having opposite instantaneous polarity; a second main winding positioned in said slots formed by three angularly spaced apart coil groups each having four concentric coils and by a coil arranged in the slots between each of said three coil groups; one of said three coil groups having a radial center in common with the radial center of one of said four primary poles of said first winding and having at least two of its concentric coils located in the same slots as coils of said one primary pole of said first winding; switching means connecting all the coils of said one primary pole in series relation with all the coils of said one coil group of said second winding for energization therewith; the respective coils of said one coil group having less turns than the corresponding coils in the other two coil groups and being in additive magnetic relation with the coil turns of said one pole of said first winding to produce augmenting M.M.F.'s when said second winding is energized; said last mentioned one coil group of the second winding and said additive serially connected one pole of said first winding, together with the remainder of the coils in said second winding, defining six primary running poles for operating the motor at low speed, all of the running poles for both high and low speed operation being generally symmetrical in M.M.F. patterns for either of the running speeds.

6. In a single phase induction type motor for operation selectively at two speeds, a magnetic core having a plurality of slots; a first main winding having coils disposed in said slots to form a predetermined number of primary running poles for operating the motor at one speed; a start winding positioned in said slots to form a number of primary starting poles corresponding in number to the poles of said first main running winding and displaced in said slots from said primary running poles; a second main running winding having coils arranged in said slots; at least a part of the coils of one primary pole of said first winding arranged in series relation with said second winding for selective energization therewith; said coils of sad one primary pole of said first main winding and said second winding together forming primary running poles in excess of the number of poles of said first winding for operating the motor at a second speed; means for connecting said first main winding and start winding in parallel for starting the motor at either speed, said means being arranged to deenergize the start winding after the motor has attained a predetermined speed and to energize selectively either set of primary main winding running poles providing two speed operation for the motor.

No references cited.